(12) United States Patent
Azegami

(10) Patent No.: US 8,277,152 B2
(45) Date of Patent: Oct. 2, 2012

(54) END MILL

(75) Inventor: Takayuki Azegami, Akashi (JP)

(73) Assignee: Mitsubishi Materials Corporation, Tokyo (JP)

( * ) Notice: Subject to any disclaimer, the term of this patent is extended or adjusted under 35 U.S.C. 154(b) by 406 days.

(21) Appl. No.: 12/725,781

(22) Filed: Mar. 17, 2010

(65) Prior Publication Data

US 2010/0239378 A1    Sep. 23, 2010

(30) Foreign Application Priority Data

Mar. 23, 2009  (JP) .................................. 2009-069860

(51) Int. Cl.
  *B23C 5/10*  (2006.01)
  *B23C 5/00*  (2006.01)
(52) U.S. Cl. ............................................ 407/54; 407/53
(58) Field of Classification Search .................. 407/53, 407/54, 55, 60, 61
  See application file for complete search history.

(56) References Cited

U.S. PATENT DOCUMENTS

| | | | | |
|---|---|---|---|---|
| 4,560,308 A | * | 12/1985 | Deller | 407/53 |
| 5,160,232 A | * | 11/1992 | Maier | 408/223 |
| 5,213,452 A | * | 5/1993 | Kirby | 407/42 |
| 6,997,651 B2 | * | 2/2006 | Kawai et al. | 407/53 |
| 7,588,396 B2 | * | 9/2009 | Flynn | 407/54 |
| 8,047,747 B2 | * | 11/2011 | Flynn | 407/53 |

FOREIGN PATENT DOCUMENTS

| | | |
|---|---|---|
| EP | 1299208 A1 | 4/2003 |
| EP | 2181787 A1 | 5/2010 |
| JP | 2005-125433 A | 5/2005 |
| JP | 2008-044038 A | 2/2008 |
| WO | WO 2008/068818 A1 | 6/2008 |
| WO | WO 2009/025197 A1 | 2/2009 |

OTHER PUBLICATIONS

European Search Report mailed Jun. 21, 2010 for the corresponding European Patent Application No. 10002881.0.

* cited by examiner

*Primary Examiner* — Will Fridie, Jr.
(74) *Attorney, Agent, or Firm* — Leason Ellis LLP.

(57) ABSTRACT

An end mill having a gash formed in a top portion of a flute. In a cross-section perpendicular to an intersecting ridgeline between an end cutting edge rake face and a gash bottom face of the gash, the gash bottom face and the end cutting edge rake face, and the gash bottom face and the gash wall face are respectively connected together by first and second connecting faces. The connecting faces have a form which either is a concave curve or a substantially concave curve formed with straight lines. A radius of curvature of the concave curve or the radius of a circle inscribed within straight lines forming the substantially concave curve about the front connecting face is larger than a radius of curvature of the concave curve or the radius of a circle inscribed within the straight lines forming the substantially concave curve about the second connecting face.

8 Claims, 2 Drawing Sheets

END MILL

CROSS-REFERENCE TO RELATED APPLICATION

The present application claims priority from Japanese Patent Application No. 2009-069860, filed on Mar. 23, 2009, and is hereby incorporated by reference in its entirety herein.

FIELD OF THE INVENTION

The present invention relates to an end mill, and more particularly, to an end mill in which a flute is formed in the periphery of a top portion of an end mill body and a gash is formed in the top of a flute, such that the wall face of the gash which faces the end mill rotating direction is an end cutting edge rake face and an end cutting edge is formed at the top of the wall face.

BACKGROUND OF THE INVENTION

End mills, such as a square end mill, a radius end mill, and a ball-nosed end mill, are known in which a gash is formed in the top of a flute formed in the periphery of a top portion of an end mill body. The gash has a shape which is like a shape formed by cutting out a wall face of the flute which faces an end mill rotating direction. The wall face of the flute facing the end mill rotating direction is an end cutting edge rake face, and an end cutting edge is formed along a top side ridge portion of the wall face.

For example Japanese Unexamined Patent Application Publication No. 2005-125433 ("the '433 Publication") which is incorporated by reference herein in its entirety, discloses end mills in which an intersecting ridgeline is positioned between the end cutting edge rake face and the gash bottom face of the gash which faces the top side of the end mill body. Another intersecting ridgeline is positioned between this gash bottom face and the gash wall face of a gash which faces the rear side in the end mill rotating direction. A cross-section, which is perpendicular to a direction in which at least one of the intersecting ridgeline extends, shows that this intersecting ridgeline portion has a form like a concave curved shape. The concave curve formed in the cross-section of the intersecting ridgeline has a radius of curvature, and the radius of curvature at the outer peripheral side of the end mill body is longer than that at the inner peripheral side of the end mill body.

Also, Japanese Unexamined Patent Application Publication No. 2008-44038 ("the '038 Publication"), which is incorporated by reference herein in its entirety, discloses a ball-nosed end mill in which a gash having a V-shape in a cross-section perpendicular to the flute of the gash is provided at a hemispherical portion of an axial top, and a radius cutting edge is formed along this gash. A cutting-edge-rear-side side wall, which is one of several side walls paired with each other in the V-shaped gash, is opposite to the radius cutting edge. The side wall has a concave surface which is smoothly concave in a cross-section perpendicular to the flute of the gash.

In the end mill described in the '433 Publication, one intersecting ridgeline is positioned between the end cutting edge rake face and the gash bottom face, and also the other intersecting ridgeline is between the gash bottom face and the gash wall face. If one of the above two intersecting ridgelines has a form like a concave curved shape in a cross-section perpendicular to the direction in which the intersecting ridgeline extends, the other intersecting ridgeline must have a form in which the end cutting edge rake face and the gash bottom face intersect each other at a narrow angle, as if a face were sharply bent; and/or the gash bottom face and the gash wall face intersect each other at a narrow angle, as if a face were sharply bent. Therefore, chips which are generated by the end cutting edge and flow along the end cutting edge rake face may cause clogging that hinders smooth chip discharging.

Additionally, in the above case where the end cutting edge rake face and the gash bottom face intersect each other at an angle, and/or the gash bottom face and the gash wall face intersect each other at a narrow angle; stresses tend to concentrate at the intersecting ridgeline which in concentration may cause a crack. Thereby, the top portion of the end mill body formed between the gashes may be fractured. In addition, problems similar to the above problems also exist in the end mill described in the '038 Publication, since, in this end mill, the concave surface formed on the cutting-edge-rear-side side wall intersects the radius-cutting-edge-side side wall at a narrow angle or may be connected with the radius-cutting-edge-side side wall by a concave circular-arc having a small radius.

In the end mill described in the '433 Publication, the intersecting ridgeline between the end cutting edge rake face and the gash bottom face and the intersecting ridgeline between the gash bottom face and the gash wall face have a form similar to a concave curved shape in a cross-section. In particular, FIG. 3 of the '433 Publication shows that the gash bottom face itself becomes a concave circular-arc shape with a large radius of curvature, by which the end cutting edge rake face and the gash wall face are smoothly connected to each other. In such a case, chips can flow smoothly and the stress concentration does not arise.

In this case, however, since the end cutting edge rake face and the gash wall face need to be connected together by a concave circular-arc having a large radius of curvature, the width of the gash increases. Additionally, the thickness (back metal) of the top portion of the end mill body decreases, such that the top portion loses its good rigidity. The top portion of the end mill body is located on the rear side of the end cutting edge in the end mill rotating direction, and is formed between the gashes. This problem becomes especially significant in an end mill in which the number of end cutting edges is three or more, the number of gashes is three or more, and the top portion thereof is largely cut out to form the gashes.

SUMMARY OF THE INVENTION

The present invention is directed to provide an end mill having a gash capable of ensuring an excellent chip discharge performance and of preventing stress concentration, without losing the rigidity of a top portion of an end mill body as described above.

An end mill according to a preferred embodiment the present invention includes an end mill body that rotates on an axis. A flute is formed in a periphery of a top portion of the end mill body and a gash is formed in a top portion of the flute. The gash has a shape which is like a shape formed by cutting out a wall face of the flute which faces an end mill rotating direction. A wall face of the gash, which faces the end mill rotating direction, is an end cutting edge rake face; and an end cutting edge is formed along a top side ridge portion. A gash bottom face of the gash is formed between the end cutting edge rake face and the wall face of the gash which faces the rear side in the end mill rotating direction. Connecting faces connect the gash bottom face and the end cutting edge rake face, and connect the gash bottom face and the gash wall face. The connecting faces have a concave curved shape or a substantially concave curved shape formed with straight lines in a cross-section perpendicular to an intersecting ridgeline between the end cutting edge rake face and the gash bottom face. One connecting face, which connects the gash bottom face and the end cutting edge rake face, is a first connecting face. Another connecting face, which connects the gash bottom face and the gash wall face, is a second connecting face. A radius of curvature of the first connecting face is larger than a radius of curvature of the second connecting face in the above cross-section, or a radius of a circle inscribed in the straight lines forming the first connecting face is larger than a radius of a circle inscribed in the straight lines forming the second connecting face in the above cross-section.

In the end mill having the aforementioned construction, the end cutting edge rake face, the gash wall face, and the gash bottom face form the gash. As mentioned previously, the connecting faces, having a concave curved shape or a substantially concave curved shape formed with straight lines in a cross-section, connect the gash bottom face and the end cutting edge rake face along one intersecting ridgeline between them, and connect the gash bottom face and the gash wall face along another intersecting ridgeline between them, respectively. If intersecting angles, between the end cutting edge rake face and the gash bottom face, and between the gash bottom face and the gash wall face are substantially the same, the stress concentration decreases and the chip discharge performance is improved as compared to a case in which the above intersecting angles are not as large.

A connecting face which connects the gash bottom face and the end cutting edge rake face, is the first connecting face, and a connecting face which connects the gash bottom face and the gash wall face is the second connecting face. The first connecting face has a radius of curvature which is larger than that of the second connecting face in the above cross-section, or alternatively, the radius of a circle inscribed in the straight lines forming the first connecting face is larger than that of a circle inscribed in the straight lines forming the second connecting face in the above cross-section. That is, the first connecting face, which connects the gash bottom face and the end cutting edge rake face, is formed so as to be curved more greatly than the second connecting face. In this case chips can flow from the end cutting edge rake face, to the gash bottom face in good condition in a similar manner to the case where the whole gash bottom face has a concave circular-arc with a large radius of curvature in a cross-section.

On the other hand, the second connecting face has a radius of curvature which is smaller than that of the first connecting face in the above cross-section, or alternatively, the radius of a circle inscribed in the straight lines forming the second connecting face is smaller than that of a circle inscribed in the straight lines forming the first connecting face in the above cross-section. In this case chips can flow smoothly even if the gash does not have such a large width. Therefore, the end mill having the aforementioned construction can exhibit a good chip discharge performance by improving chip flow, and can also exhibit good rigidity by maintaining the wall thickness of the top portion thereof as well.

According to the present invention, concerning the above-disclosed first and second connecting faces, it is preferable that the radius of curvature of the first connecting face is in the range of from 0.04×D to 0.08×D, or the radius of a circle inscribed in the straight lines forming the first connecting face is in the range of from 0.04×D to 0.08×D, in the cross-section. D in this case is the external diameter of the end cutting edge. If the radius of curvature of the first connecting face or the radius of curvature of the inscribed circle about the first connecting face is smaller than this range, chips cannot smoothly flow through the first connecting face. Further, since the radius of curvature of the second connecting face or the radius of curvature of the inscribed circle about the second connecting face is smaller than that of the first connecting face, chip clogging and/or stress concentration may arise. On the other hand, if the radius of curvature of the first connecting face or the radius of curvature of the inscribed circle about the first connecting face is larger than this range, the radius of curvature of the second connecting face or the radius of curvature of the inscribed circle about the second connecting face needs to be excessively small to avoid increasing the width of the gash.

Additionally, for the same reason, the radius of curvature of the second connecting face is preferably in the range of from 0.01×D to 0.05×D, or the radius of a circle inscribed in the straight lines forming the second connecting face is preferably in the range of from 0.01×D to 0.05×D, in the cross-section. If the radius of curvature of the second connecting face or the radius of curvature of the inscribed circle about the second connecting face is smaller than this range, chip clogging and/or stress concentration at the second connecting face may arise. On the other hand, if the radius of curvature of the second connecting face or the radius of curvature of the inscribed circle about the second connecting face is larger than this range, the radius of curvature of the first connecting face or the radius of curvature of the inscribed circle about the first connecting face will need to be longer than that of the second connecting face and then the width of the gash may undesirably increase.

In addition, as the motioned above, since the gash having a small width enables the top portion of the end mill body to maintain good strength, applying this invention to an end mill in which three or more end cutting edges are formed at the top of the end mill body is particularly effective. In other words, even if a gash has a large width, an end mill having such a gash, and having one or two end cutting edges can hold a sufficient wall thickness for the top portion of the end mill body formed between the gash and the next gash on the rear side of the end cutting edge in the end mill rotating direction. However, for an end mill having three or more end cutting edges, holding such a large wall thickness is difficult.

As described above, since a gash according to the present invention does not have such a large width; such a gash enables the top portion of the end mill body to improve its rigidity and enables chips generated by the end cutting edge to flow smoothly. Thus, a good chip discharge performance can be secured; and stress concentration can be prevented. In this manner, the top portion of the end mill body can become free from fractures; the tool life of the end mill is extended; and stable milling can be performed.

BRIEF DESCRIPTION OF THE DRAWINGS

The features of the present invention will be made more readily apparent from the Detailed Description of the Invention which reference the drawings, in which.

Like reference numbers are used in the drawing figures to connote like elements of the present invention.

DESCRIPTION OF REFERENCE NUMERALS AND SIGNS

1: END MILL BODY
3: CUTTING EDGE PART

4: FLUTE
4A: PERIPHERAL CUTTING EDGE RAKE FACE
5: PERIPHERAL CUTTING EDGE
6: GASH
6A: END CUTTING EDGE RAKE FACE
6B: GASH BOTTOM FACE
6C: GASH WALL FACE
7: END CUTTING EDGE
8A, 9A: FIRST CONNECTING FACE
8B, 9B: SECOND CONNECTING FACE
O: AXIS OF END MILL BODY 1
T: END MILL ROTATING DIRECTION
R1, r1: RADIUS OF CURVATURE OF CONCAVE CURVE FORMING FIRST OR SECOND CONNECTING FACE 8A OR 8B IN CROSS-SECTION PERPENDICULAR TO INTERSECTING RIDGELINE BETWEEN END CUTTING EDGE RAKE FACE 6A AND GASH BOTTOM FACE 6B
R2, r2: RADIUS OF CIRCLE INSCRIBED IN LINES FORMING FIRST OR SECOND CONNECTING FACE 9A OR 9B IN CROSS-SECTION PERPENDICULAR TO INTERSECTING RIDGELINE BETWEEN END CUTTING EDGE RAKE FACE 6A AND GASH BOTTOM FACE 6B

DETAILED DESCRIPTION OF THE INVENTION

Figure 1:
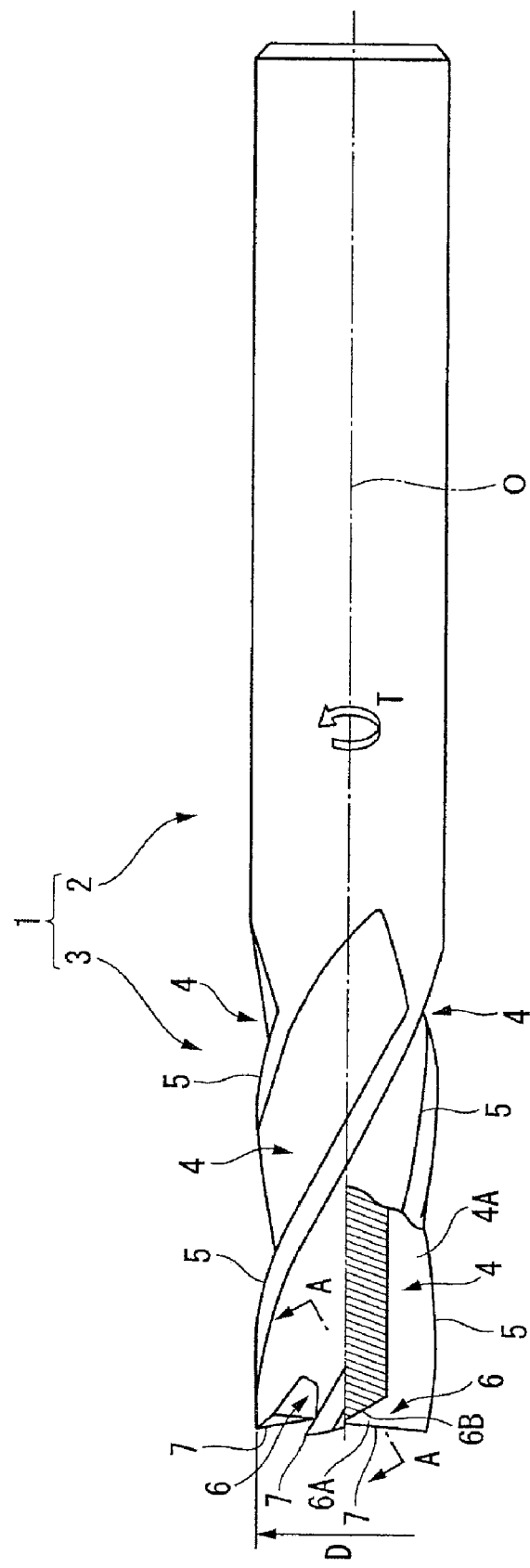
FIG. 1 presents a side view with a partial sectional view according to a first embodiment of the present invention.
Figure 2:
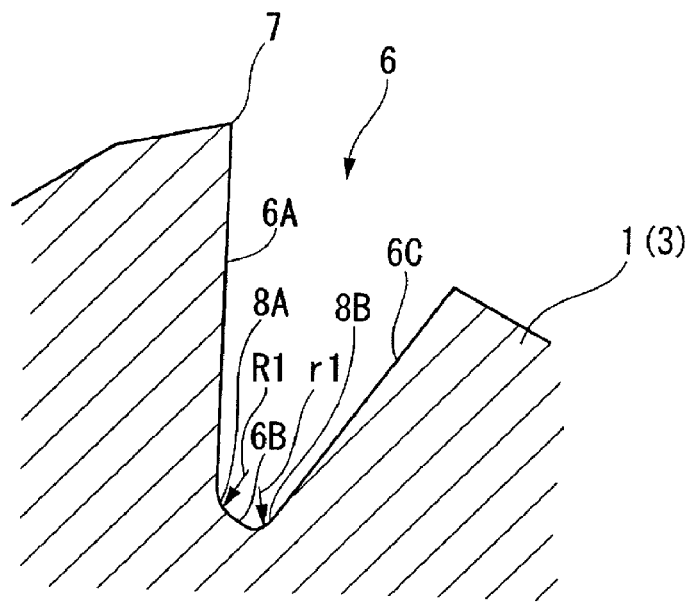
FIG. 2 presents a magnified cross-sectional view of the end mill of the first embodiment in FIG. 1. taken along the cross-section 2-2 of FIG. 1.

In a first preferred embodiment of the invention shown in FIGS. 1 and 2, an end mill body 1 is made of a hard material such as cemented carbide, and has a substantially cylindrical shape having an axis O is its center axis. A rear end part (a right part in FIG. 1) of the end mill body is a shank part 2 having a cylindrical shape, and a top part (a left part in FIG. 1) of the end mill body is a cutting edge part 3. As the first step in using an end mill according to the present invention, the shank part 2 is fixed to a spindle of a machine tool and rotated in an end mill rotating direction T on the axis O. The end mill is then fed in a direction intersecting the axis O, enabling the cutting edge part 3 to cut into a workpiece to machine it.

Three or more flutes 4 (four in this illustrated embodiment of FIGS. 1 and 2) in a helix shape in a reverse direction to the end mill rotating direction T around the axis O from the top side toward the rear end side, are formed in the periphery of the cutting edge part 3. A cross-section perpendicular to the axis O as illustrated in FIG. 2 shows that wall faces of the flutes 4 facing the end mill rotating direction T, have a concave curved shape that is concave backward in the end mill rotating direction T. Also, peripheral cutting edges 5 are formed along the peripheral ridge portions on the cutting edge part. Therefore, the wall faces become rake faces of the peripheral cutting edges 5 (i.e., peripheral cutting edge rake faces 4A). In the embodiment illustrated in FIG. 1, the four peripheral cutting edges 5 are formed helically in accordance with the helical shape of the flutes 4 in which the peripheral cutting edge rake faces 4A are formed.

On the other hand, gashes 6 which extend radially inwardly from the flutes 4, are formed at a top portion of the end mill body 1. Wall faces of the gashes 6 facing the end mill rotating direction T, have a form which is like a shape formed by cutting out the wall face 4A at only the inner peripheral side of the wall face 4A, or from the inner peripheral side of the wall face 4A to the periphery of the end mill body 1. End cutting edges 7 which extend radially inwardly from the tops of the peripheral cutting edges 5 toward the inner peripheral side of the end mill body 1, are formed along the top side ridge portions of the wall faces.

Accordingly, in the illustrated embodiment, the wall faces of the gashes 6 which face the end mill rotating direction T, become rake faces of cutting edges 7 (i.e., end cutting edge rake faces 6A) and the four end cutting edges 7 have a linear form which extends radially inwardly from the outer peripheral side of the top portion of the end mill body 1 towards the inner peripheral side thereof. The number of the end cutting edges 7 is three or more, the same as that of the peripheral cutting edges 5. In this illustrated embodiment, there are four end cutting edges 7. In this case, the end mill is a square end mill having a form in which a rotational locus of each peripheral cutting edge 5 on the axis O is a substantially cylindrical shape having the axis O as its center and the rotational locus of each peripheral cutting edge 5 intersects a rotational locus of each cutting edge 7 on the axis O at approximate right angles.

Moreover, each gash 6 includes a gash bottom face 6B which is connected to the portion of the end cutting edge rake face 6A on the forward side in the end mill rotating direction T, and faces the top side of the end mill body 1 in the direction of the axis O. The gash 6 further includes a gash wall face 6C which is connected to a portion of the end cutting edge rake face 6B on a further forward side in the end mill rotating direction T, and faces a rear side in the end mill rotating direction T so as to face the gash bottom face 6A. In this embodiment, the gash wall face 6C has an even shape, and extends to a top side in the direction of the axis O so as to move away from the end cutting edge rake face 6A as it goes to the top side.

Therefore, a side view of the end mill body 1 shows that the gash 6 is a V-shaped flute whose width increases gradually toward the top side, and also that the gash 6 has a form whose width increases gradually toward an outer peripheral side.

In the illustrated embodiment, as shown in FIG. 2, a cross-section, which is perpendicular to an intersecting ridgeline between the end cutting edge rake face 6A and the gash bottom face 6B, shows that the end cutting edge rake face 6A and the gash bottom face 6B are smoothly connected together by a first connecting face 8A having a concave curved shape. Also, as shown in FIG. 2, a cross-section, which is perpendicular to an intersecting ridgeline between the end cutting edge rake face 6A and the gash bottom face 6B, shows that the gash bottom face 6B and the gash wall face 6C are also connected together by a second connecting face 8B having a concave curved shape. Further, the above cross-section shows that a radius of curvature R1 of a concave curve formed by the first connecting face 8A is larger than a radius of curvature r1 of a concave curve formed by the second connecting face 8B. The above intersecting ridgeline is an assumed ridgeline where the extended end cutting edge rake face 6A and the extended gash bottom face 6B intersect each other.

In the illustrated embodiment, the above cross-section shows that the first connecting face 8A and the second connecting face 8B each have a form which is a concave circular-arc shape. The radius of curvature R1 of the concave circular-arc formed by the first connecting face 8A, is preferably set in the range of from 0.04×D to 0.08×D in the above cross-section, and the radius of curvature r1 of the concave circular-arc formed by the second connecting face 8B is preferably set in the range of from 0.01×D to 0.05×D in the above cross-section. Here, D refers to the external diameter of the end cutting edge 7. In addition, the gash bottom face 6B may alternatively remain in an even shape between both first and second connecting faces 8A and 8B, or the gash bottom face 6B may be a common tangent portion which both first and second connecting faces 8A and 8B having a concave curved shape in the cross-section touch smoothly.

In an end mill having such a construction, the end cutting edge rake face 6A and the gash bottom face 6B do not intersect each other at an angle, but the first connecting face 8A having a concave curved shape in the cross-section connects them smoothly. Also the gash bottom face 6B and the gash wall face 6C of the gash 6 do not intersect each other at an angle, but the second connecting face 8A having a concave curved shape in the cross-section connects them smoothly. Thus, stresses caused by cutting forces and the like do not concentrate at the intersecting ridgeline. Further, the intersecting ridgeline remains free from cracking caused by such stress concentrations. Therefore, the end cutting edge 7 can be prevented from fracturing, and then the tool life of the end mill can be extended.

Furthermore, as mentioned above, in the illustrated embodiment, the end cutting edge rake face 6A and the gash bottom face 6B do not intersect each other at an angle, but the first connecting face 8A having a concave curved shape in the cross-section connects them smoothly. Also, the gash bottom face 6B and the gash wall face 6C of the gash 6 do not intersect each other at an angle, but the second connecting face 8A having a concave curved shape in the cross-section connects them smoothly. Therefore, chips which are generated by the end cutting edge 7 and should flow out along the end cutting edge rake face 6A can flow smoothly and can be discharged without the occurrence of chip clogging at the intersecting ridgeline between the end cutting edge rake face 6A and the gash bottom face 6B, or at the intersecting ridgeline between the gash bottom face 6B and the gash wall face 6C.

Moreover, the radius R1 of the first connecting face 8A which connects the end cutting edge rake face 6A and the gash bottom face 6B is larger than the radius r1 of the second connecting face 8B which connects the gash bottom face 6B and the gash wall face 6C. Thus, while the chips are going from the first connecting face 8A to the second connecting face 8B, the chips gradually receive resistance force, and then the resistance force gradually makes the chips curl. Therefore, a great cutting resistance is not applied to the end mill body 1 as compared to a case in which the chips receive resistance force in a short time, and then the resistance force makes the chips curl in a short time. This construction also can extend the tool life of the end mill, and then smooth cutting work can be performed in good conditions.

Also, as described above, the radius R1 of the first connecting face 8A is larger than the radius r1 of the second connecting face 8B. In other words, the radius r1 of the second connecting face 8B is smaller than the radius R1 of the first connecting face 8A. In an end mill having the above construction, as compared to a case in which a connecting face having a large radius such as the radius R1 of the first connecting face 8A connects the gash bottom face 6B and the gash wall face 6C; a space between the gash wall face 6C and the end cutting edge rake face 6A, namely, the width of the gash 6 can be smaller than such a space in a conventional end mills.

As a result, the wall thickness of the top portion of the end mill body 1 formed between the gashes 6, which are adjacent to each other radially, can be increased, and the rigidity of the top portion of the end mill body 1 on the rear side in the end mill rotating direction T of the end cutting edge 7 can be improved. The top portion of the end mill body 1 formed between the gashes 6 is thereby reliably prevented from fracturing, enabling the tool life of the end mill to be further extended. These results are effective for an end mill in which the number of the end cutting edges 7 is three or more, such as in the illustrated embodiment and the wall thickness of the top portion of the end mill body 1 formed between the gashes 6 tends to decrease.

Figure 3:
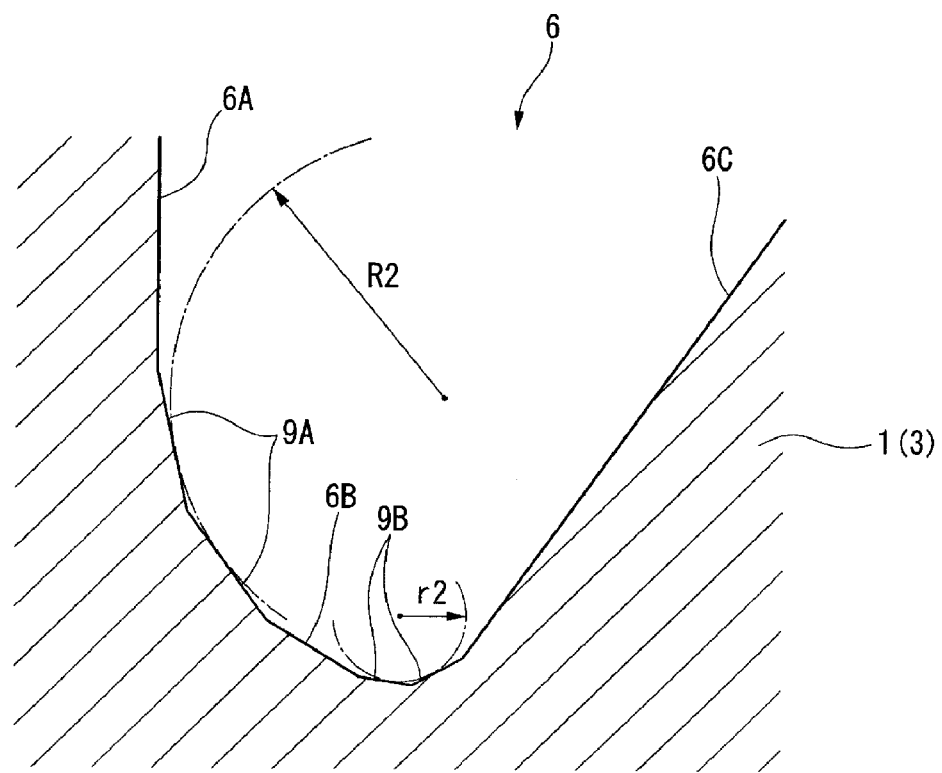
FIG. 3 presents another magnified cross-sectional view along the cross-section 2-2 of FIG. 1, showing a second embodiment of the present invention.

Next, FIG. 3 shows a second preferred embodiment of the present invention, and is a sufficiently magnified view of a portion equivalent to the gash bottom face 6B of the first embodiment of FIG. 2 in the cross-sectional view perpendicular to the intersecting ridgeline between the end cutting edge rake face 6A and the gash bottom face 6B. The parts common to those of the first embodiment have the same reference numerals as the first embodiment. Thus, further description of such parts is omitted.

In the first embodiment, the first and second connecting faces 8A and 8B have a concave curved (concave circular-arc) shape in the cross-section. On the other hand, in the second embodiment, first and second connecting faces 9A and 9B have a substantially concave curved shape formed with straight lines in the cross-section. In this shape, the cross-section shows that the end cutting edge rake face 6A, the gash bottom face 6B, and the gash wall face 6C are straight lines. A first connecting face 9A formed with straight lines connects the end cutting edge rake face 6A and the gash bottom face 6B and a second connecting face 9B formed with straight lines connects the gash bottom face 6B and the gash wall face 6C. The first connecting face 9A intersects each of the end cutting edge rake face 6A and the gash bottom face 6B at an obtuse angle, and the second connecting face 9B intersects the gash bottom face 6B and each of the gash wall face 6C at an obtuse angle.

Additionally, radius R2 of a circle inscribed in the straight lines forming the first connecting face 9A is larger than radius r2 of a circle inscribed in the straight lines forming the second connecting face 9B. In this embodiment, the radius R2 about the first connecting face 9A is preferably set in the range of from $0.04 \times D$ to $0.08 \times D$, and the radius r2 about the second connecting face 9B is preferably set in the range of from $0.01 \times D$ to $0.05 \times D$. D is the external diameter of the end cutting edge 7.

In this second preferred embodiment, the end mill has a construction wherein the first and second connecting faces 9A and 9B having a substantially concave curved shape formed with straight lines intersect the end cutting edge rake face 6A, the gash bottom face 6B, and the gash wall face 6C at wide angles in the cross-section. Thus, such a construction can control the stress concentration, as compared to a construction where the end cutting edge rake face 6A and the gash bottom face 6B intersect each other at a narrow angle and/or the gash bottom face 6B and the gash wall face 6C intersect each other at a narrow angle. Additionally, chips generated by the end cutting edge 7 can flow out and go along the circular arc of the circle of radius R2 inscribed in the straight lines forming the first and second connecting faces 9A and 9B in the cross-section. Thus, the chips can flow smoothly in a similar manner to the first embodiment along the concave curves (concave circular-arcs) forming the first and second connecting faces 9A and 9B in the cross-section.

Also, the radius R2 of the circle inscribed in the straight lines forming the first connecting face 9A is larger than the radius r2 of a circle inscribed in the straight lines forming the second connecting face 9B in the cross-section. Thus, in a similar manner to the first embodiment, this construction can control the increase of cutting resistance by the chips can reduce the width of the gash 6 and can prevent the end mill body 1 from fracturing. The connecting faces 9A and 9B can be formed easily, as compared to the first embodiment. In the first embodiment, the first connecting face 8A smoothly connects the end cutting edge rake face 6A to the gash bottom face 6B, and the second connecting face 8B smoothly connects the gash bottom face 6B and the gash wall face 6C.

In the second preferred embodiment, a construction is usable wherein, in the cross-section, the first connecting face 9A has a straight line shape, and connects the end cutting edge rake face 6A to the gash bottom face 6B. The second connecting face 9B has a straight line shape, and connects the gash bottom face 6B to the gash wall face 6C. In this case, a substantially concave curve is formed with straight lines (namely, these connecting faces, the end cutting edge rake face 6A, the gash bottom face 6B, and the gash wall face 6C). Alternatively, another construction is usable wherein the first connecting face 9A, which is formed with straight lines intersecting each other at an obtuse angle, connects the end cutting edge rake face 6A and the gash bottom face 6B and the second connecting face 9B, which is formed with straight lines intersecting each other at an obtuse angle, connects the gash bottom face 6B and the gash wall face 6C. In the above two constructions, lines which are two of the straight lines forming the substantially concave curve, and are next to each other preferably intersect each other at an obtuse angle of 120 deg. or more.

In the first and second preferred embodiments, if the radius of curvature R1 of a concave curve (concave circular-arc) of the first connecting face 8A is too small, or if the radius R2 of a circle inscribed in the straight lines forming the substantially concave curve, namely, the first connecting face 9A, is too small, chips are hindered from flowing smoothly. Since the radius of curvature r1 of the second connecting face 8B needs to be smaller than R1, and the radius r2 of the circle inscribed in the straight lines forming the second connecting face 9B, needs to be smaller than R2, chip clogging and/or stress concentration may arise. On the other hand, if the radius R1 or R2 is too large, this will necessitate either a reduction of the radius r1 or r2 of the second connecting face 8B or 9B or an increase in the width of the gash 6.

Similarly, if the radius r1 or r2 of the second connecting face 8B or 9B is too small, chip clogging and/or stress concentration may arise in the second connecting face 8B or 9B. On the other hand, if the radius r1 or r2 of the second connecting face 8B or 9B is too large, then the radius R1 or R2 of the first connecting face 8A or 9A needs to be larger than such a radius r1 or r2. In this case, the problem of increasing the width of the gash 6 may arise. Therefore, as disclosed above, the radius R1 or R2 of the first connecting face 8A or 9A is preferably set in the range of from 0.04×D to 0.08×D, and the radius r1 or r2 of the second connecting face 9A or 9B is preferably set in the range of from 0.01×D to 0.05×D.

In the above description, in the first embodiment, both first and second connecting faces have a concave curved shape in a cross-section; and, in the second embodiment, both first and second connecting faces have a substantially concave curved shape formed with straight lines in a cross-section. In addition, another configurations consistent with principles of the present invention may be used where a cross-section shows that the first connecting face has a concave curved shape and the second connecting face has a substantially concave curved shape formed with straight lines or the first connecting face has a substantially concave curved shape formed with straight lines and the second connecting face has a concave curved shape. In this case, the radius of the concave curve of the first connecting face, or the radius of a circle inscribed in the straight lines forming the first connecting face; is larger than the radius of the concave curve of the second connecting face, or the radius of a circle inscribed in the straight lines forming the second connecting face.

While the invention has been particularly shown and described herein with reference to preferred embodiments thereof, it will be understood by those skilled in the art as described herein that various changes in form and details may be made to the discloses embodiments without departing from the spirit and scope of the invention. Accordingly, the invention is to be limited only by the scope of the claims and their equivalents.

I claim:

1. An end mill having
an end mill body rotatable on an axis, the end mill body comprising:
a flute formed in a periphery of a top portion of the end mill body; and
a gash formed in a top portion of the flute, wherein
the gash has a shape which appears to be formed by cutting out a wall face of the flute which faces an end mill rotating direction,
a wall face of the gash which faces the end mill rotating direction, is an end cutting edge rake face,
an end cutting edge is formed along a top side ridge portion,
a gash bottom face of the gash is formed between the end cutting edge rake face and the wall face of the gash which faces the rear side in the end mill rotating direction,
respective connecting faces connect the gash bottom face to the end cutting edge rake face, and the gash bottom face to the gash wall face,
the connecting faces have a concave curved shape or a substantially concave curved shape formed with straight lines in a cross-section perpendicular to an intersecting ridgeline between the end cutting edge rake face and the gash bottom face,
one of the connecting faces which connects the gash bottom face and the end cutting edge rake face is a first connecting face,
another connecting face which connects the gash bottom face and the gash wall face is a second connecting face, and either:
a radius of curvature of the first connecting face is larger than a radius of curvature of the second connecting face in the cross-section, or
a radius of a circle inscribed in the straight lines forming the first connecting face is larger than a radius of a circle inscribed in the straight lines forming the second connecting face in the cross-section.

2. The end mill according to claim 1 wherein
the radius of curvature of the first connecting face is in the range of from 0.04×D to 0.08×D, or
the radius of a circle inscribed in the straight lines forming the first connecting face is in the range of from 0.04×D to 0.08×D, in the cross-section, where
D is the external diameter of the end cutting edge.

3. The end mill according to claim 1, wherein
the radius of curvature of the second connecting face is in the range of from 0.01×D to 0.05×D, or
the radius of a circle inscribed in the straight lines forming the second connecting face is in the range of from 0.01×D to 0.05×D, in the cross-section, where
D is the external diameter of the end cutting edge.

4. The end mill according to claim 1,
wherein three or more end cutting edges are formed at the top portion of the end mill body.

5. The end mill according to claim 2, wherein
the radius of curvature of the second connecting face is in the range of from 0.01×D to 0.05×D, or
the radius of a circle inscribed in the straight lines forming the second connecting face is in the range of from 0.01×D to 0.05×D, in the cross-section, where
D is the external diameter of the end cutting edge.

6. The end mill according to claim 2,
wherein three or more end cutting edges are formed at the top portion of the end mill body.

7. The end mill according to claim 3,
wherein three or more end cutting edges are formed at the top portion of the end mill body.

8. The end mill according to claim 5,
wherein three or more end cutting edges are formed at the top portion of the end mill body.

* * * * *